Sept. 15, 1964 E. G. KEETON 3,148,644
SEED PLANTER
Filed July 31, 1962 3 Sheets-Sheet 3
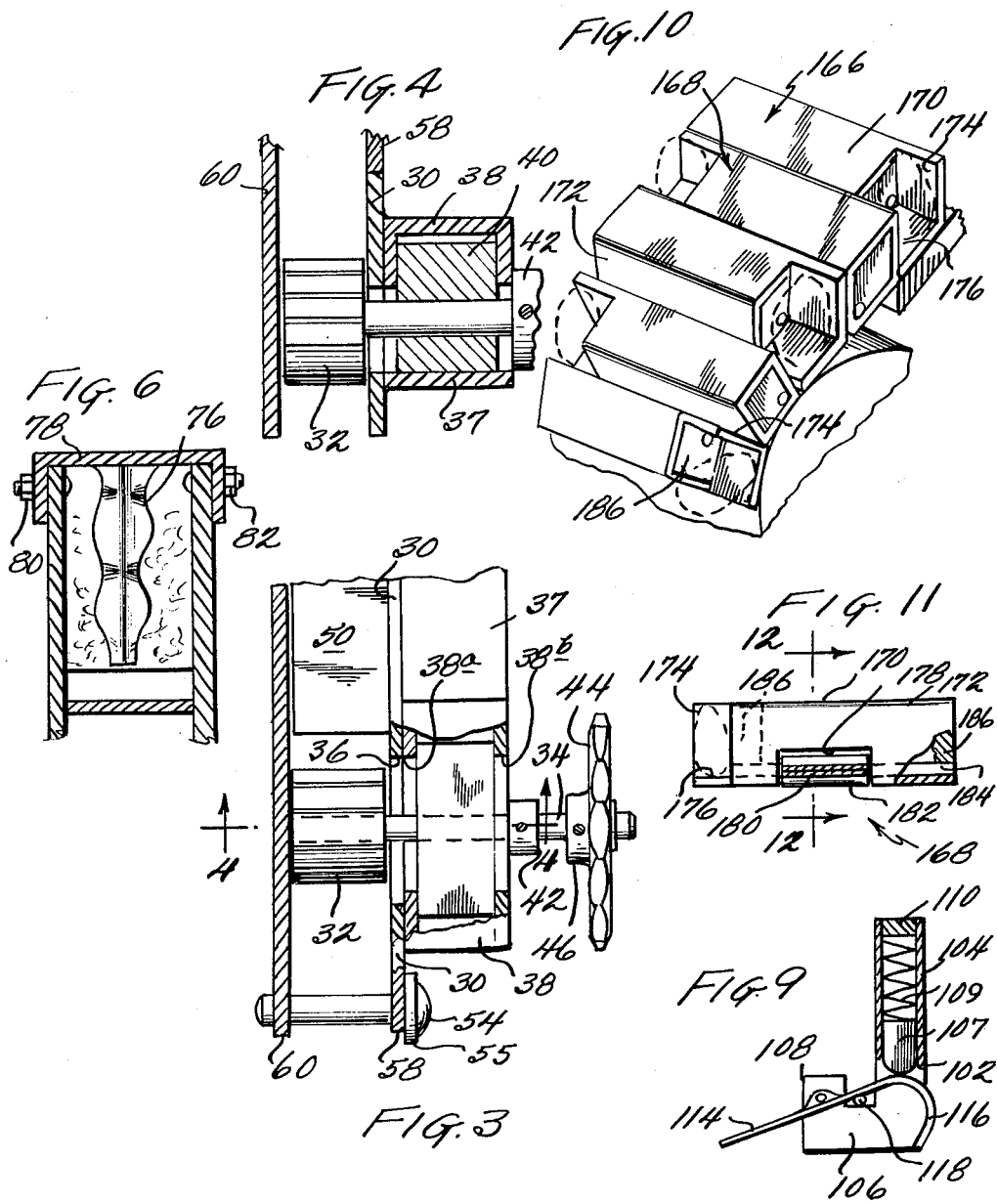
INVENTOR
EUGENE G. KEETON
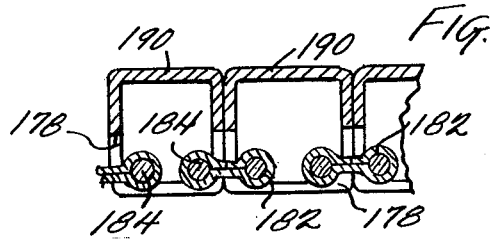
ATTORNEYS

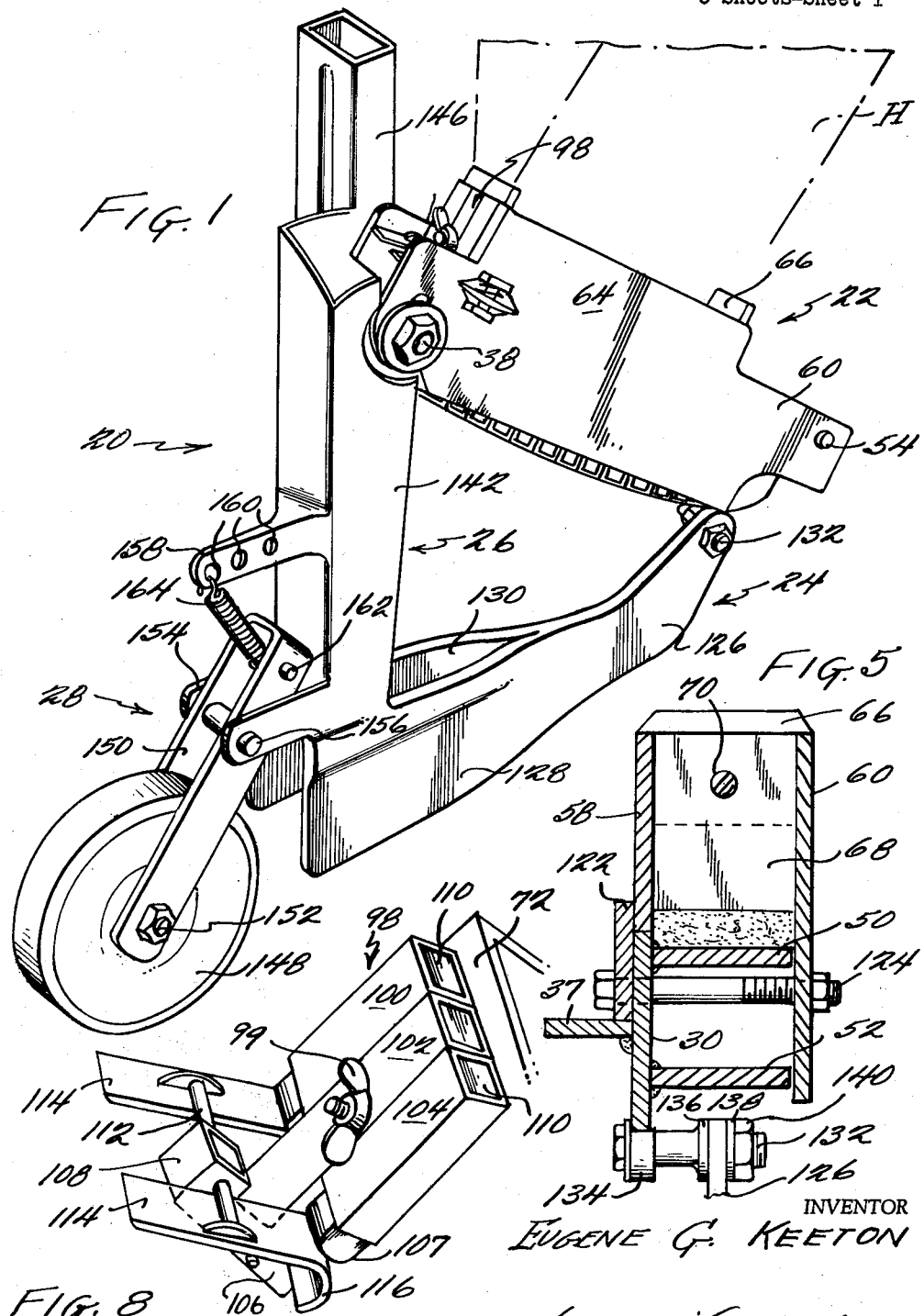

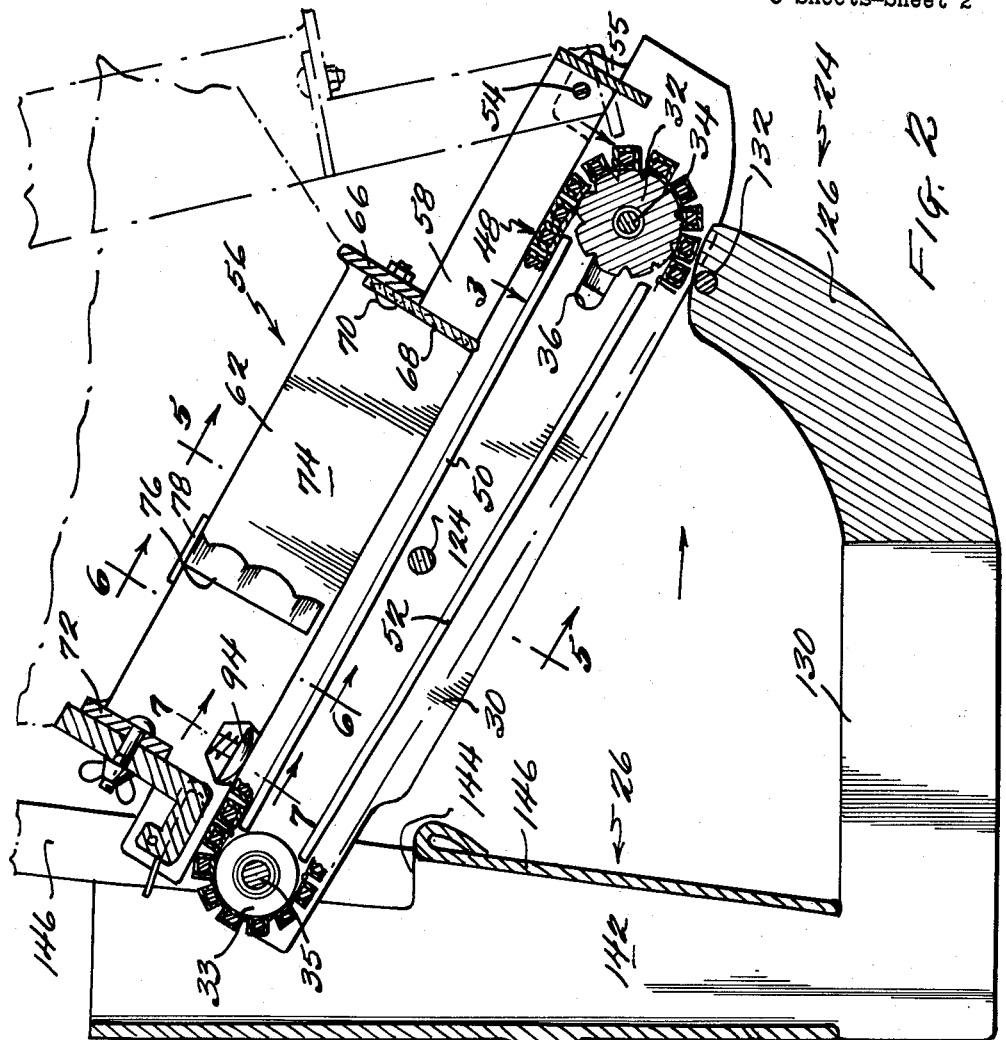
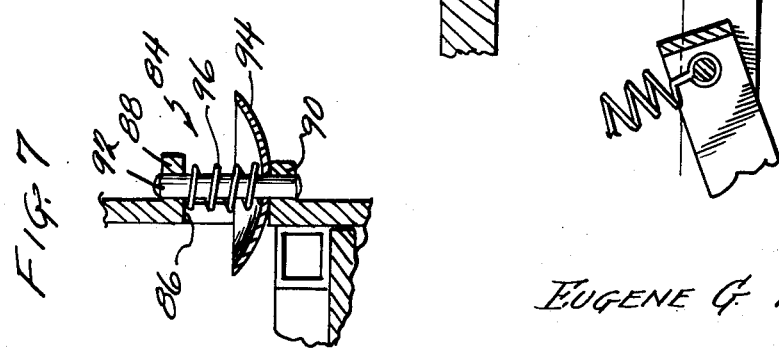

United States Patent Office 3,148,644
Patented Sept. 15, 1964

3,148,644
SEED PLANTER
Eugene G. Keeton, Trenton, Ky.
Filed July 31, 1962, Ser. No. 213,789
4 Claims. (Cl. 111—79)

This invention has reference to a new and improved seed planter of the type operative to be pulled by a tractor or the like to dispense seeds onto a furrow formed in the ground.

According to this invention, there is provided a seed planter which includes new and improved means for conveying the seed to a dispensing tube so that the likelihood of the seed planter depositing an excess number of seeds at intervals along the furrow or skipping the spaced intervals where the seed is to be deposited, is effectively obviated.

This invention contemplates the provision of a seed planter wherein the seed is conveyed along an upwardly inclined path by a conveyor chain of new and improved construction. In this regard, the conveyor chain includes links which define an uninterrupted planar top surface during its upward flight, the links having opposed seed-receiving recesses. Means are provided for deflecting excess seeds out of these recesses to prevent an excess number of seeds from falling to the ground at any given position. By virtue of the planar top surface of the conveyor chain, the excess seeds have a tendency to fall downwardly to the forward end of the seed planter where they will be eventually picked up by the recesses in the chain. Also, the tendency of a seed to become clogged in the conveyor chain is advantageously eliminated due to the fact the seed-receiving recesses are formed in part by adjacent links so that when the conveyor chain terminates its upward flight about a conveyor wheel, these recesses open up to insure the seed is dropped in the dispensing tube. The seed planter according to this invention lends itself to planting seed of different sizes, provision being made for quickly and easily removing the seed conveyor chain with one size of seed-receiving recesses for a conveyor chain having larger or smaller seed-receiving recesses.

Another significant feature of the present invention resides in the provision of a pivoted wheel assembly joined to the rearward end of the seed planter which is operative to retard the downward movement of the seed planter as it is being readied for use. There is a tendency for the dispensing tube to become clogged when the seed planter is initially used in the muddy soil or the like, thereby preventing effective dispensing of the seeds. This is generally occasioned by the fact that the seed planter is dropped quickly catching the muddy soil therebetween. The wheel assembly is constructed to retard this downward movement, but nevertheless is effective to be overcome by the weight of the seed planter, so that the seed planter rides on the ground with the wheel raised during normal planting use.

Still other features of the present invention reside in the arrangement of new and improved means for deflecting excess seeds from the seed-receiving recesses of the conveyor chain; a seed conveyor chain of new and improved construction; and a seed planter which is notably reliable and trouble-free in operation, and of relatively inexpensive construction.

These and still further objects, advantages and novel features of the invention will become evident in the specification and claims, taken in connection with the accompanying drawings.

In the drawings:

FIGURE 1 is a perspective view of the seed planter according to this invention;

FIGURE 2 is a side elevation section view of the seed planter in FIGURE 1;

FIGURE 3 is a sectional plan view of the front end of the seed planter taken substantially along line 3—3 in FIGURE 3;

FIGURE 4 is a view taken along line 4—4 in FIGURE 3;

FIGURES 5, 6, and 7 are transverse sectional views taken along lines 5—5, 6—6, and 7—7, respectively, in FIGURE 2;

FIGURE 8 is a partial perspective view of a seed deflector;

FIGURE 9 is a side elevational view, partially broken out, of the seed deflector in FIGURE 8;

FIGURE 10 is a perspective view of a portion of the seed conveyor chain;

FIGURE 11 is a front elevation view of a chain link; and

FIGURE 12 is a longitudinal section view of a series of chain links, taken along line 12—12 in FIGURE 11.

Referring now to the drawings, there is shown a seed planter 20 which includes: a seed-carrying conveyor section 22 mounted on a furrow forming frame 24; a seed dispensing station 26; and, a wheel arrangement 28 at its rearward end.

The seed-carrying conveyor section 22 includes a longitudinally extending side plate 30, which is inclined upwardly and rearwardly to the dispensing station 26.

The seed planter 30 carries at its opposite ends front and rear conveyor wheels 32 and 33, which are mounted on bolt shafts 34 and 35, respectively. The front conveyor wheel 32 constitutes a chain drive wheel and is therefore of serrated construction. The rear shaft 35 is joined to the side plate 30 by welding or the like, while the front shaft 34 passes through a longitudinally extending adjustment slot 36 in the side plate 30. The side plate 30 also carries an aligned transverse plate 37 below the slot 36, and a rectangular guide channel 38 is carried on the plate 37. The guide channel 38 has longitudinal slots 38a and 38b, which correspond to the slot 36. The shaft 34 is received in a rectangular block 40, slidably carried within the rectangular guide channel 38. Thus, the longitudinal position of the conveyor wheel 32 is regulated by the movement of the block 40 within the guide channel 38, and the same is held in driving position by gravity, due to the inclined position of the block 40. The shaft 34 carries a bushing 42 adjacent the outside extremity of the rectangular guide channel 38, and the free end of the shaft 34 carries a sprocket 44 which is drivingly connected to the shaft 34 by a hub 46 having a pin connection.

Thus, longitudinal spacing between the wheels 32 and 33 may be adjusted, so as to removably carry a transversely mounted seed-conveyor chain 48, to be described in detail. Suffice for the present to observe that the chain 48 is easily mounted to the wheels by sliding the same about the free ends of the conveyor wheels 32 and 33, and the chain is rotated by any suitable timed driving means from the sprocket wheel 44.

In order to support the chain 48 in its upward flight so that the same lies flat, a chain supporting plate 50 extends between the wheels 32 and 33 and is joined to the side plate 30 as by welding. Likewise, a lower guide plate 52 is carried by the side plate 30 between the conveyor wheels 32 and 33, so that the chain 48 is positioned under the plate 52 during its downward flight toward the conveyor wheel 32.

The side plate 30 carries at its forwardmost end a bolt 54 via an upright plate 55, welded thereto. A hopper frame 56 is pivotally connected to this bolt 54 as will now be explained. This hopper frame 56 includes a generally rectangular side plate 58, which lower edge is adapted to rest on the top plate of the side plate 30 (FIGURE 5). The opposite side plate 60 of the hopper frame 56 is of greater height, so that it extends downwardly below the lower guide plate 52. The configuration of the upper edges of the hopper frame side plates 58 and 60 is the same, their respective major lengths 62 and 64 which extend forward from the dispensing station being relatively high, and are joined together at their rearward ends of these portions by a transverse plate 66. The forward-most portions of this side plate 60 beyond the transverse plate 66 conceals the chain 48 and otherwise maintains its alignment on the conveyor wheels 32 and 34.

A flap 68 of resilient material is joined to this transverse plate 66 as by a bolt 70. This flap 68 extends downwardly a sufficient distance below the transverse plate to abut the chain 48 as necessary to prevent seeds from falling forward and out of the seed conveyor section 22. The rearward end of the plates 58 and 60 carries another transverse plate 72 which terminates a distance above the upper surface of the chain 48, which is movable therebelow.

Thus, there is formed by the major portions 62 and 64 of the hopper frame side plates 58, 60 the transverse plates 66, 72, and the chain supporting plate 50, a generally rectangular seed receiving chamber 74. Conveniently, a suitable hopper H can be mounted to the hopper frame 56 by any suitable means, so as to supply seeds to the chamber 74.

For reasons to become apparent, it is desired to deflect the seeds in chamber 74 toward the hopper frame side plates 58 and 60. To this end, a downwardly extending V-shaped deflector plate 76 (FIGURE 6) is positioned centrally within the chamber 74. The apex of the deflector 76 faces the dispensing station 26 and is supported within the recess by a top plate 78 carried on the upper edges of the hopper frame side plates 58 and 60.

This deflector 76 may be joined to the side plates 58 and 60 in any suitable fashion. For example, in FIGURE 6, the top plate 78 is shown as being in the shape of an inverted channel, which is joined to the hopper frame side plates 58 and 60 by bolts 80 and 82, respectively.

According to one important feature of this invention, the side plates 58 and 60 each carry a seed deflector 84 closely adjacent the rearward transverse wall 72. As best shown in FIGURE 7, each of these walls has a small aperture 86 with outwardly extending upper and lower flanges 88 and 90, respectively. These flanges carry a pin 92 which is generally perpendicular to the chain supporting plate 50. A dished deflector plate 94 is movably carried on the pin 92 and is biased in a downward direction by a compression spring 96. The dished plate 94 is positioned closely adjacent the upper surface of the chain 48 as it moves along its upper flight. As will become evident, these dished plates 94 are operative to insure that but a single seed is carried from the seed chamber 74 to the dispensing station 26.

Also, the end plate 72 carries another seed deflector 98 by a wing bolt assembly 99, as best shown in FIGURES 8 and 9. The deflector 98 takes the form of three rectangular tubular elements 100, 102, and 104 welded together to form a generally rectangular block. The outside elements 100 and 104 terminate a distance above the bottom of the central element 102 which is formed into a generally J-shaped configuration having a horizontal bottom portion 106 and an upright leg portion 108. The bottom surface of the portion 106 is adapted to ride over the central portion of the chain 48 in closely spaced relationship, so as to keep the seed towards the side walls 58 and 60 of the hopper frame 56.

The outside elements 100 and 104 are of identical construction and carry therein a vertically movable push rod 107 extending downwardly below its bottom, the push rod 107 being biased in a downward direction by a compression spring 109, which is fixed within the element 104 (and 100) by weld metal or the like 110 at its upper end.

The upright leg 108 of the central element 102 carries a transverse pin 112 which is rotatable with respect to the leg 108. Joined to the opposite ends of this pin 112 are deflector plates 114 which are angularly inclined relative to the upper flight of the chain 48, terminating at their rearward ends in an arcuate portion 116. Thus, the deflector plates 114 are generally J-shaped with their arcuate portions 116 being biased downwardly by the push rods 106. These deflector plates 114 are pivotable relative to the leg 108 by virtue of being joined to the rotatable rod 112, such as by welding. Also, the horizontal portion 106 carries a transverse pin 118 which passes adjacent the underside of the deflector plates 114. Thus, the pin 118 limits the downward stroke of the plates 114 which are rotatable on the pin 112. As will become apparent, the arcuate portions 116 of the plates 114 are operative in conjunction with the dished plates 94 of deflectors 84 to insure that no more than one seed is transferred from the seed chamber 74 to the dispensing station 26. This is assured inasmuch as deflectors 84 are located on each side of chain 48 in advance of deflector means 98. Therefore, if a double seed does manage to get by either the deflectors 84, then it will be eliminated by the deflector 98. By virtue of the compression spring 109, binding is prevented. The bottom surfaces of the bottom portion 106 and the arcuate portions 116 are spaced closely together so that they overlay the chain 48 along its entire width as the chain 48 terminates its upward flight.

A depending plate 122 is joined to the outside of the plate 30, and a bolt 124 is removably carried by aligned apertures in the plates 122, 30 and 60, to thereby lock the hopper frame 56 in its lower position.

The furrow forming frame 24 takes the form of a single plate 126 at its forward end, dividing into spaced apart, rearwardly extending plates 128 and 130. The plate 126 is joined to the bottom of the side plate 30 via a transfer bolt 132 joined to the forward end of the plate 30. In this regard, a reinforcing collar 134 is welded to the plate 30 and carries the bolt 132 as by welding. A spacer washer 136 is welded to the bolt 132 to insure proper alignment of the plate 126 on the bolt 132. This structure is secured by another washer 138 and a nut 140.

The plates 128 and 130 terminate at their rearward ends at the dispensing station 26. Here, a vertical, generally rectangular tube 142 is joined to the plates 128 and 130 at its lower end, and to the side plate 30 at its upper end. This tube 142 has a long slot 144 on its wall 146 facing the conveyor wheel 33, this wheel 33 being positioned within the slot 144. As will become apparent, seeds which are carried toward the dispensing station 26 are dropped into the tube 132 where they fall to the ground in the furrow between the plates 128 and 130. Another structural member 146 is welded to one side of the dispensing tube 142, for ease of handling, and for reinforcing purposes.

In order to prevent muddy soil from clogging the space between the plates 128 and 130 below the tube 142, the wheel arrangement 28 is operative to retard the downward movement of the seed planter 20 in preparation for use. To this end, a wheel 148 is carried by a U-bracket 150, the wheel 148 being joined to the lower free ends of the legs of the bracket by a bolt 152. The tube 142 carries a lower rearwardly extending bracket 154 for receiving the intermediate leg portions of the bracket 150 in a pivotal fashion via a connecting bolt 156.

The U-bracket 150 is thereby pivotal with respect to the dispensing tube 142, the wheel 148 having the tendency to pivot upwardly with respect to the bolt 156 as the seed planter 20 is initially lowered to the ground.

Mounted above the lower bracket 154 is an upper bracket 158, also extending rearwardly from the dispensing tube 142. The upper bracket 158 has longitudinally spaced apertures 160, and the U-bracket 150 has a transverse pin 162 at its base. Carried between selected apertures 160 and the pin 162 is a coil spring 164 which has a spring constant of a sufficient magnitude to retard the upward movement of the wheel 148 as the seed planter 20 is lowered to the ground, the spring constant being sufficiently small so that the weight of the seed planter 20 overcomes the spring force. Thus, when the seed planter 20 is lowered to the ground, the wheel 148 is pivoted upwardly so as not to interfere with the planting of the seeds.

Reference is now made to FIGURES 10–12 which show in detail the seed conveyor chain 48.

This chain 48 is composed of a series of alternate links 166 and 168. These links 166 and 168 are generally of similar construction, taking the form of a rectangular tube, which is preferably square in cross-sectional configuration (FIGURE 12). The links are constructed and arranged to receive a seed at their sides. To this end, the links 166 have cut-out portions in their right side while the alternate links 168 have an identical cut-out portion in their left sides. Keeping in mind these links are preferably formed of rectangular tubular material, the cut-out portions are formed by cutting away the top and front walls 170 and 172, respectively, a pre-determined distance from the alternate sides of the links. This leaves the seed-receiving chambers defined by the back wall 174, the bottom wall 176 and the back wall 174 of the next forward link. Also, the links 166 and 168 have central rectangular openings 178 formed in the lower part of the forward and rearward walls 172 and 174, and continuously across the bottom wall 176. In order to join the adjacent links 166 and 168 closely together, there is provided a bent rectangular plate 180 having enlarged transverse passages 182 at its opposite ends. These opposite ends are carried within the openings 178 of the tubular links 166 and 168 by transverse pins 184 so that the adjacent links are pivotable relative to one another. The pins 184 are retained within the links 166 and 168 by weld metal 186 or the like placed in their open ends.

It should be observed that the top surface of the top walls 170 thereby defines a planar surface as the chain 48 moves along its upper flight on the plate 50. Seeds thereby fall into the alternate seed-receiving recesses, due to the fact the width of the chain 48 conforms to the spacing between the hopper frame side plates 58 and 60. Excess seeds are deflected out of the recesses by the dished plates 94 and the seed deflector 98. These dished plates and the seed deflector cooperate to effectively remove excess seeds from the seed-receiving recesses of the chain 48, and the seeds have a tendency to slide down the inclined planar surface of the upper flight of the chain 48. The size of the seed-receiving recess in a particular chain is greater or less, depending upon the particular size of the seeds being planted. The significance of this arrangement resides in the fact that a small seed-receiving recess may be formed in the chain 48 to receive selected seed sizes and the chain 48 is quickly and easily changed to one with larger seed-receiving recesses simply by sliding the chain 48 transversely off the conveyor wheels 32 and 33. As the chain 48 terminates its upward flight, moving about the conveyor wheel 33, there is no tendency for any seed to become clogged within the seed-receiving recesses due to the fact that the seed-receiving recesses open up at this point. That is to say, when the chain 48 terminates its upward flight, the forward wall of a particular seed-receiving recess defined by the adjacent rearward wall 174 of the next forward link is pivoted away from the next rearward link, so that any seed which is stuck within the recesses of the chain 48 is advantageously freed.

The operation of the seed planter 20 is as follows:

The hopper frame 56 is pivoted upwardly about the bolt 54 after the retaining bolt 124 is removed. Depending upon the size of the seed to be planted, a selected chain 48 (FIGURES 10–12) is transversely slipped onto the conveyor wheels 32 and 33. The hopper frame 56 is then pivoted downwardly and is bolted to the side plate 30 with the bolt 124 passing through aligned apertures in said members (see FIGURE 5), the plate 60 of the hopper frame 56 insuring concealed alignment of the chain 48. A seed hopper H is arranged to deposit seeds into the seed chamber 74 and the sprocket wheel 44 is connected to a suitable drive means on the tractor or the like. As the seed planter 20 is lowered for use, the downward movement is retarded by the spring-biased wheel 148 so that the tendency of mud to become clogged between the plates 128 and 130 is minimized. As the seed planter 20 is moved forward by the tractor and the sprocket wheel 44 is driven in suitable timed relationship, chain 48 moves along its upper flight supported by the plate 50. Seeds are deposited into seed-receiving recesses of the chain 48, excess seeds having a tendency to slide back down the inclined planar surface of the top of the chain 48. As the chain 48 moves past the dished deflector plates 94, excess seeds are deflected out of the seed-receiving recesses, and the deflector 98 keeps excess seeds from entering the dispensing tube 142 due to the spring-biased arcuate portion 116 and the bottom surface of the horizontal portion 106, bridging the entire width of the chain 48. As the chain 48, with the desired seed distributiton leaves the rearward conveyor wheel 33 at the end of its upper flight, the seed-receiving recesses are opened up so that the seeds fall through the tube 142 between the plates 128 and 130.

From the foregoing description of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative, and not in a limiting sense.

What is claimed is:

1. Seed planter comprising: frame means including an upwardly and rearwardly inclined supporting plate; conveyor drive wheels positioned at opposite ends of said plate; a seed conveyor chain operative to be trained about said wheels in driving relationship and supported along its upward flight by said plate; a hopper frame pivotally mounted to said frame means above the said plate, so that the upper flight of said conveyor chain defines with said hopper frame a seed chamber, said conveyor chain being formed of plate links pivotally joined to one another, said links being of oblong, generally rectangular configuration and positioned closely adjacent one another during movement along said upper flight, the top surfaces of said links thereby being substantially continuous so that seeds carried in said hopper tend to fall downwardly along said top surfaces, said conveyor chain having two sets of seed receiving recesses, one set located on each side thereof, said recesses being defined by the rearward wall of one link and the rearward wall of the adjacent forward link so that said recesses open up at the end of said upper flight; and a first spring biased deflecting means positioned in the path of travel of each of said sets of recesses along their upper flight to deflect excess seeds out of said recess; an upright dispensing tube at the end of said upward flight for receiving seeds from said open recesses to direct the same to the ground; a second deflecting means positioned adjacent the mouth of said dispensing tube to assure in cooperation with said first deflecting means that only a single seed is received by said dispensing tube from each of said recesses; and furrow-forming plate means at the bottom of said frame means operative to separate the soil as the structure is moved along the ground.

2. Seed planter defined in claim 1 including means joined to said frame means for retarding the downward movement of the structure towards the ground in preparation for use, whereby accumulation of muddy soil and the like in the bottom of said tube is minimized.

3. Seed planter chain comprising: a chain formed of a plurality of links, each of said links being of oblong transverse configuration, defining thereby parallel forward and rearward walls and parallel upper and lower walls; said links having recesses in their respective forward, bottom and rearward walls; transition members mounted within adjacent recesses and pivotally connecting adjacent links to one another with adjacent forward and rearward walls spaced closely to one another sufficient to prevent seeds from falling therebetween, whereby the upper walls of said links define a substantially continuous seed-receiving surface; and regularly spaced apart seed-receiving recesses in said links, said latter recesses being defined in part by the rear wall and bottom wall of one link and by the rear wall of the next forward link, whereby said recesses open when said links traverse a curved surface.

4. Seed planter chain defined in claim 3 wherein said links are of tubular construction.

References Cited in the file of this patent

UNITED STATES PATENTS

| | | | |
|---|---|---|---|
| 151,388 | Harbin | | May 26, 1874 |
| 202,625 | Avery | | Apr. 23, 1878 |
| 251,132 | Pates | | Dec. 20, 1881 |
| 262,439 | Lindsay | | Aug. 8, 1882 |
| 434,268 | Harsin | | Aug. 12, 1890 |
| 467,683 | Essex | | Jan. 26, 1892 |
| 1,304,992 | Lanham | | May 27, 1919 |
| 2,286,143 | Lee | | June 9, 1942 |
| 2,307,415 | Malhiot | | Jan. 5, 1943 |
| 2,510,658 | Rassmann | | June 6, 1950 |
| 2,636,459 | Graves | | Apr. 28, 1953 |
| 2,704,594 | Gorby | | Mar. 22, 1955 |
| 2,963,998 | Bliss | | Dec. 13, 1960 |

FOREIGN PATENTS

| | | | |
|---|---|---|---|
| 93,487 | Austria | | July 10, 1923 |
| 206,192 | Germany | | Jan. 27, 1909 |
| 418,675 | Germany | | Sept. 15, 1923 |